United States Patent Office
3,736,282
Patented May 29, 1973

3,736,282
POLYMERIC LATICES AND SUSPENSIONS BASED ON VINYL CHLORIDE HOMOPOLYMERS AND COPOLYMERS
Edward Joseph Fetter, Stamford, and Frederick Lyle Andrew, West Norwalk, Conn., assignors to American Cyanamid Company, Stamford, Conn.
No Drawing. Filed June 4, 1971, Ser. No. 150,165
Int. Cl. C08f 45/46
U.S. Cl. 260—29.6 MQ                3 Claims

ABSTRACT OF THE DISCLOSURE

Disodium isodecylsulfocuccinate is an unusually good surfactant for emulsion polymerization of vinyl chloride. It is also useful for emulsion polymerization of vinylidene chloride and for suspension polymerization of vinyl chloride.

---

The invention relates to improvements in the polymerization of vinyl chloride and other vinyl monomers and particularly to the use of a selected surfactant which improves the emulsion polymerization of vinyl chloride and mixtures of vinyl chloride with other vinyl monomers and which also improves the ultimate polymer product.

The polymerization of vinyl chloride in aqueous emulsions is known and persons having skill in this art will readily recognize the importance of surface active agents as emulsifiers for emulsion polymerization, which will affect the polymerization reaction in aqueous medium as well as the properties of the emulsion product containing the polymer resins and will even affect the properties of the ultimate dried resin product which are obtained when the emulsion is applied and dried.

U.S. Pat. No. 3,329,640, patented July 4, 1967 to F. Scotti and F. L. Andrew described the use of half acid esters of sulfosuccinic acid wherein one of the carbonyl groups of the succinic acid is esterified with an alkanol or an alkyl substituted phenol or an ethoxylated derivative thereof. Such half acid esters may be prepared either by monoesterification of maleic anhydride followed by sulfonation or by monoesterification of sulfosuccinic acid, using for the esterification one of such alkyl and aromatic alcohols and ethoxylated derivatives thereof. That patent was directed broadly to the emulsion polymerization of vinyl monomers using such half acid esters of sulfosuccinic acid as emulsifiers for the emulsion polymerization. It was directed in more detail to the use of half acid sulfosuccinates esterified with the ethoxylated derivatives of an alkanol or an alkyl-substituted phenol, in the emulsion polymerization of vinyl acetate.

In various emulsion polymerization processes for making vinyl polymer latex, the particular surfactant selected is found to influence several properties such as the reaction time required for polymerization, the percentage of filterable polymer coagulum in the emulsion, the amount of coagulum which collects on the reactor walls and the like. Also, the emulsifier will affect the completeness of the polymerization reaction and the yield of polymer in the finished emulsion as a percentage of the starting monomer. Properties of the polymer emulsion product which are affected by the selected surfactant include the particle size of the dispersed polymer in the emulsion, the surface tension of the emulsion, the weight percent of solids in the polymer emulsion, the shelf stability and mechanical stability of the emulsion, etc. Even the dried polymer coatings or films made from the emulsion are found to have properties such as color and color stability on heating, etc., which are affected by the choice of emulsifiers.

One of the principal objects of the invention is to provide a particular emulsifier for emulsion polymerization of vinyl chloride and co-polymerization of vinyl chloride with up to about 25 wt. percent of one or more comonomers such as the alkyl and cycloalkyl esters of acrylic acid and the like. This particular emulsifier, monoisodecyl sulfosuccinate, preferably the disodium salt, when used as the emulsifier for the preparation of aqueous emulsion homopolymers and copolymers of vinyl chloride is found to induce very high yields of polymer product in aqueous emulsions which have a very favorable balance of properties. Although some of the several properties of the emulsion products obtained with the present emulsifier may be equaled by other emulsifiers, no other emulsifier was found, even among those that are chemically most closely related, that could match the present emulsifier in producing polyvinyl chloride emulsions having so many of the several favorable properties desired. This excellent balance of properties includes, among the more outstanding ones, superior color stability of the dry resin product upon exposure to heat, excellent resistance to deposition of polymer coagulum on the reactor walls during the polymerization reaction, extremely low production of filterable coagulum in the emulsion and substantially reduced reaction time required for the polymerization reaction.

In addition to its use for the preparation of vinyl chloride homopolymer and copolymer emulsions, the disodium isodecyl sulfosuccinate is also useful in the aqueous formulations that are used for suspension polymerization of vinyl chloride and also is advantageously used as an emulsifier in processes for emulsion polymerization of vinylidene chloride to make polyvinylidene chloride homopolymer and copolymer latex.

The emulsifier of the present invention may be prepared by any of several suitable methods such as by half esterifying maleic anhydride with isodecanol followed by sulfonation of the half ester product. For example, isodecanol may be substituted for the $C_{12}$–$C_{14}$ normal alkanols that were used in the process described in detail in U.S. Pat. No. 3,329,640 for preparing the emulsifier described as Emulsifier D in that patent. Although the disodium salt of the isodecyl half acid ester is preferred for its convenience, the emulsifier may be used in its acid form or as any water soluble salt having metal cations other than sodium, such as other alkali metal salts. In aqueous solution, the acid or its salts are essentially ionized so that the character of the cation probably does not directly affect the function of the anion in solution. This selected emulsifier is excellent for use in any of the emulsion polymerization procedures that are employed in the art for the preparation of polyvinyl chloride homopolymers and copolymers.

The proportion of emulsifier utilized in our novel process ranges from about 0.25% to about 8.0%, preferably from about 1.0% to about 5.0%, by weight, based on the weight of the monomers used during the reaction. The emulsifier may be utilized in smaller amounts, i.e., amounts sufficient to conduct the polymerization under art-recognized conditions to produce a product, the properties of which can be further enhanced by post-addition of further emulsifier to bring the final concentration in the product to that range specified above according to the instant invention or, more preferably, the polymerization can be conducted utilizing an amount of emulsifier within the above range at the outset. The pH at which the polymerization is carried out is variable, i.e., the solution may be either neutral, slightly alkaline, or slightly acidic depending upon the particular monomers being polymerized or copolymerized as is recognized in the art. Likewise, the temperature of the emulsion polymerization is widely variable and may range from about −10° C. to 175° C. or more. Preferably, the polymerization reaction will be carried out at from about room temperature, 20° C., to about 70° C.

Polymerization is effected in the normal manner in the presence of catalytic amounts, e.g., 0.01% to 2% by weight, based on the weight of the monomer, of a water-soluble polymerization agent such as the well-known free-radical catalysts. Among such catalysts may be mentioned peracetic acid, hydrogen peroxide, persalts such as ammonium persulfate, sodium persulfate, potassium persulfate, potassium perborate, and the like. Oil-soluble peroxide catalysts such as benzoyl peroxide and methyl ethyl ketone peroxide are used in suspension polymerization. Any of the other conventional regulators, stabilizers, activators, supplemental agents, etc. conventionally employed in emulsion or suspension polymerization procedures can be used in the process of the invention. Among the stabilizers are the so-called protective colloids such as gelatin, casein, starch, polyvinyl alcohol, carboxymethyl cellulose, gum arabic, gum tragacanth, and the like. The regulators include such compounds as diisopropyl xanthate, the higher mercaptans such as benzyl mercaptan, octyl mercaptan, decyl mercaptan, dodecyl mercaptan, cetyl mercaptan, octadecyl mercaptan, carbon tetrachloride, ethylene dichloride, hexachloroethylene, $C_5$ to $C_8$ aliphatic alcohols, and the like and electrolytes such as tetrasodium pyrophosphate, etc.

The latices and polymers of the instant invention can be utilized as such or they may be modified by the addition thereto of any common additives such as plasticizers and fillers like calcium carbonate, etc. in amounts sufficient to satisfy the requirements for most industrial applications.

Polyvinyl chloride emulsions to which the present invention may be applied include homopolymers of vinyl chloride and copolymers of vinyl chloride with up to about 25 percent of one or more selected comonomers which are usually added for effect as a polymer modifier. For example, alkyl and cycloalkyl esters of acrylic or methacrylic acid, wherein the alkyl or cycloalkyl group may contain from 1 to 12 carbon atoms, are often added to improve the physical properties of the finished polyvinyl chloride resins. Other comonomers which may be added in minor amounts up to about 25 percent by weight of the total monomer composition for modification of the polymer coating or film include acrylonitrile, acrylamide, N-methylolacrylamide, acrylic acid, methacrylic acid, itaconic acid, vinyl acetate, ethylene and the like. For the purpose of comparative tests, a copolymer of 90 wt. percent vinyl chloride and 10 wt. percent ethyl acrylate was selected as a typical copolymer which would be sufficiently representative of the entire class of vinyl chloride polymers and copolymers, at least for the purpose of comparative evaluation of emulsifiers. In the following examples are described several of the most preferred embodiments of the invention together with comparative observations obtained by actually using other surface active agents in comparative tests, the latter being presented here to point out the singular combination of favorable properties that is obtained with the surfactant that was selected according to the invention.

EXAMPLE 1

A reaction vessel consisting of a pressure vessel having stainless steel walls is charged with a prepared aqueous solution containing 75 mls. of a five wt. percent aqueous solution of disodium isodecyl sulfosuccinate, 10 ml. of a 2.5 wt. percent aqueous solution of potassium persulfate and 45 grams of boiled deionized water. This mixture is adjusted to pH 7 with 10 percent sodium hydroxide solution. Then 13 grams of ethyl acrylate which contains about 15 p.p.m. of hydroquinone methyl ether is added. The vessel is purged for about 15 minutes with a slow stream of purified nitrogen after which the vessel is sealed and chilled and then charged with 112 grams of freshly condensed vinyl chloride which has been previously passed as the gas through a packed column of potassium hydroxide and then condensed. A slight excess of the condensed vinyl chloride is added to the vessel and then boiled off to purge the vessel. The vessel is sealed and placed in an Atlas Launder-Ometer machine in which the temperature of the water bath is maintained at 57° C. The polymerization reaction is carried out for a period of 8 hours as the sealed vessel is continuously tumbled end over end at 20 r.p.m. during the entire period. After the prescribed polymerization period, the vessel is cooled to room temperature, vented and any weight loss on venting is recorded. The vessel is opened and the latex is removed and filtered to determine the wt. percent of filterable coagulum based on the total weight of latex produced. The vessel is rinsed with water and then inspected for wall coagulum. When wall coagulum is present, the amount is determined by air-drying the vessel, then cleaning the vessel with about 225 mls. of chloroform which dissolves the wall coagulum. The solvent is agitated in the vessel at about 57° C. for 1½ hours then the solution is poured into a crystallizing dish; the solvent is evaporated and the dried product is weighed. The filtered latex is tested for mechanical stability by agitating a 50-ml. sample of the latex in a jar, by means of a twin-blade, high speed agitator rotating at 6300 r.p.m. Such agitation is continued for 15 minutes or for a shorter time if the emulsion breaks. After agitation for 15 minutes the latex is filtered and the coagulum which collects on the filter is weighed. However, in many cases involving the vinyl chloride polymers the emulsion will break before 15 minutes and in those cases only the time in minutes required to break the emulsion is recorded. To determine the percent solids in the emulsion, a weighed sample of the emulsion is placed on an aluminum dish and dried on a hot plate at 150° C. for 30 minutes, then weighed again. From the measured weights of the sample before and after drying, the percent solids composition of the emulsion is calculated. Viscosity of the emulsion in centipoise is measured by a Brookfield Viscometer using spindle No. 3 operating at 50 r.p.m. at room temperature. Particle size of the polymer in the latex is determined using an electron microscope by the method described in U.S. Pat. No. 3,329,640. Heat stability is measured in accordance with ASTM D1925–63T by the process described in U.S. Pat. No. 3,329,640. Surface tension is measured by standard procedure. Measured values of the properties of the latex prepared in this example are tabulated in Table 1.

EXAMPLE 2

A vinyl chloride homopolymer was prepared by the process described in Example 1 except no ethyl acrylate was used and 125 grams instead of 112 grams of vinyl chloride was used. Otherwise the preparation and testing procedures were the same. The measured test results are tabulated in Table 1.

TABLE 1.—TYPICAL PVC HOMOPOLYMER AND COPOLYMER LATEX PROPERTIES

| Property | 90/10 VCl/EA copolymer, Example I | VCl homopolymer, Example II |
| --- | --- | --- |
| Total solids, percent | 50.3 | 50.0 |
| Conversion, percent | 99–100 | 99–100 |
| Coagulum, percent (based on total latex): | | |
| (a) In latex | 0 | 0 |
| (b) On stainless steel vessel walls | 0.04–0.2 | 0.04–0.1 |
| Viscosity, cps | 25–30 | 25–30 |
| Particle size, avg.: peak range, A | 200–1,000 | 200–750 |
| Mechanical stability | (1) | (1) |
| Surface tension, dy./cm | 55–60 | 60–65 |
| pH | 5.6–6.0 | 5.9–6.3 |
| Heat stability | [2] Excellent | Excellent |
| Plasticizer acceptance | Excellent | Excellent |

[1] Stable 10–15 minutes.
[2] Only slight discoloration at 180° C.; no discoloration when plasticized with DOP.

In Examples 1 and 2 the time allowed for polymerization was 8 hours. In screening tests, about 40 commercially available surfactants and about 40 specially prepared surfactants were selected and evaluated in a program of making and testing emulsions as in Example 1, except in some the reaction period was continued for 20 hours instead of 8 hours and other surface active agents were substituted for disodium isodecyl sulfosuccinate in the respective tests. In Examples 1 and 2 the concentration of surfactant in weight percent is 3 percent based on the weight of monomers in the preparation. In some of the screening tests, this percentage of surfactant was varied slightly, in the range from 1 percent to 3.5 percent for various selected surfactants.

Practically all of the commercially available surfactants tested were found less than suitable for one or more reasons. Several were found to produce a paste or solid mass or non-emulsified particles instead of the desired low viscosity polymer emulsion. Several produced emulsions having very poor mechanical stability or poor heat stability or poor shelf stability. Some produced excessive coagulum which either fouled the reactor walls or separated by filtration, thus reducing the latex yield. Some caused less than complete reaction so that vinyl chloride was lost as a gas when the reactor was opened. None of the commercially available surfactants tested was judged satisfactory in the 20-hour tests.

Most of the specially prepared surfactants that were evaluated were half acid esters, half acid amides, or diesters of sulfosuccinic acid, prepared as the disodium or monosodium salts, according to procedures like those described in U.S. Pat. No. 3,329,640. Disodium sulfosuccinate monoesters were prepared from alkanols such as ALFOL® 610, ALFOL® 810, ALFOL® 1214, normal alkanols having 10, 12, 14 and 16 carbon atoms, ethoxylated alkanols such as ALFONIC® 1218–6, ALFONIC® 1218–4, and a number of substituted cyclohexanols, and the like. Disodium half acid amides of sulfosuccinic acid were also prepared from amines such as ARMEEN® C, PRIMENE® 81–R, and the like. Also, monosodium bis-alkanol diesters of sulfosuccinic acid were prepared using various alkyl and cycloalkyl alcohols having 6 to 16 carbon atoms. "ALFOL," "ALFONIC," "ARMEEN," and "PRIMENE," are registered trademarks.

Of all the surfactants evaluated in the 20-hour tests, only the following were judged sufficiently suitable for more extensive evaluations:

Disodium monoamide sulfosuccinamate of PRIMENE® 81–R (PRIMENE® 81–R is principally a mixture of highly-branched primary alkyl amines having 12 to 14 carbon atoms).
Disodium monoester sulfosuccinate of tridecyl alcohol.
Disodium monoester sulfosuccinate of 2,6,8-trimethyl-4-nonanol.
Disodium monoester sulfosuccinate of isodecanol.

Of these four, the isodecanol ester was outstanding for the consistently low coagulum, and particularly low reactor wall coagulum, superior color stability on heating, excellent shelf stability and high surface tension of the latex made with this surfactant. The PRIMENE® 81–R monoamide gave latex of less suitable color stability on heating; it produced a good latex but of a somewhat darker color than wanted. The tridecyl alcohol monoester produced a good latex but the latex had shorter shelf life than wanted, and it produced more reactor wall coagulum than was wanted. The trimethylnonanol monoester produced good latex, but results were inconsistent on repeated testing, often producing excessive coagulum either on the filter or on the reactor walls or both.

In addition to its superior balance of favorable properties as described, the disodium isodecyl sulfosuccinate was found to induce complete reaction and production of good latex in only 6 to 8 hours. This latex is as good as or better than those produced in 20 hours. All of the other surfactants that had been judged worthy of further evaluation by the 20-hour tests were found to be somewhat less satisfactory in tests run at 8 hours reaction time than they had been in the 20-hour tests. For example, the PRIMENE® 81–R monoamide gave incomplete reaction with attendant reduced yield in the 8-hour tests. The others all exhibited a similar tendency, but to a lesser degree.

The n-decyl equivalent of disodium isodecyl sulfosuccinate was made and tested in both the 20-hour and the 8-hour tests. It was judged less suitable than the isodecyl ester because of its own physical properties, apart from its use as an emulsifier; the 50 wt. percent aqueous solution of the n-decyl monoester disodium salt is a semi-solid paste which is less convenient for handling than the liquid solution of the isodecyl monoester salt at the same concentration. In the polymerization tests, the n-decyl monoester produces a good latex in good yield but is found to leave higher levels of wall coagulum so that it is judged inferior to the isodecyl monoester for this use.

The particular advantages obtained with disodium isodecyl sulfosuccinate that most strikingly distinguish it from other good emulsifiers for the preparation of vinyl chloride homopolymer and copolymer emulsions are the consistently observed excellent resistance to formation of coagulum on the reactor walls and the consistently excellent resistance to discoloration by yellowing when the polymer is heated. The filtered latex containing this emulsifier contains usable emulsified polymer in over 99 percent conversion based on the starting monomers, indicating near quantitative polymerization and only very small loss to coagulum. These results are consistently reproducible in many repetitions of the test.

EXAMPLE 3

The process of Example 1 is repeated but with the substitution of 112 gm. vinylidene chloride for the vinyl chloride, and using instead of the amounts in Example 1, respectively 15 ml. potassium persulfate and 30 gm. water, and in addition 10 ml. of sodium bisulfite. Test results are shown in Table II.

EXAMPLE 4

A suspension polymerization process is used to prepare a vinyl chloride homopolymer. To 186 gm. of boiled and deionized water is added 0.32 gm. METHOCEL® HG–65 (a cellulose methyl ether present as a protective colloid), 0.19 gm. benzoyl peroxide and 1.9 ml. of a 5 percent solution of disodium isodecyl sulfosuccinate. "METHOCEL" is a registered trademark. The pH is adjusted to 7 with NaOH. The solution is placed in a reaction vessel, purged with purified nitrogen and charged with 63 gm. of freshly condensed vinyl chloride, sealed and placed in the Launder-Ometer bath, all the same as described in Example 1. In this case the polymerization is carried out for 16 hours. The final polymer slurry is readily filtered, washed and dried. Test results are shown in Table II.

TABLE 2.—TYPICAL PROPERTIES OF PVDC LATE AND PVC SUSPENSION POLYMER

| Property | 90/10 VDC/ EA copolymer, Example III | PVC susp. pol., Example IV |
|---|---|---|
| Total solids, percent | 50.3 | 25 |
| Conversion, percent | 100 | ~100 |
| Coagulum, percent (based on total charge): | | |
| (a) In latex | 0 | |
| (b) On stainless steel vessel walls | 0.04–0.1 | [1] Slight |
| Viscosity, cps | 25–30 | |
| Particle size, A | 250–600 | [2] 100–385 |
| Mechanical stability | [3] | |
| Surface tension, dy./cm | 58–62 | |
| pH | 4.8–5.1 | |
| Heat stability | [4] | [4] |
| Plasticizer acceptance | | [4] |

[1] Not determined.
[2] Bulk range.
[3] Stable 15 minutes.
[4] Very good.

We claim:

1. An aqueous emulsion of a vinyl addition polymer in which vinyl chloride constitutes at least 75% by weight of said polymer, with from about 0.25% to about 8% by weight based on polymer weight in the emulsion, of isodecyl monoester of sulfosuccinic acid or a water-soluble salt thereof in said emulsion as an emulsifier.

2. An emulsion defined by claim 1 wherein said emulsifier is disodium isodecyl sulfosuccinate.

3. An emulsion defined by claim 2 wherein said polymer is the copolymer of about 90% by weight vinyl chloride and about 10% by weight of ethyl acrylate.

References Cited
UNITED STATES PATENTS
3,329,640  7/1967  Scotti _____ 260—29.6 MQ WILLIAM H. SHORT, Primary Examiner
L. M. PHYNES, Assistant Examiner U.S. Cl. X.R.
260— 17 R, 17.4 ST & R, 29.6 T & TA, 78.5 BB, 80.73, 87.5 C & R, 92.8 W